(12) United States Patent
Weppenaar et al.

(10) Patent No.: US 8,891,070 B2
(45) Date of Patent: Nov. 18, 2014

(54) FLEXIBLE PIPE SYSTEM

(75) Inventors: Nicky Weppenaar, Copenhagen (DK); Bo Asp Møller Andersen, Stenløse (DK)

(73) Assignee: National Oilwell Varco Denmark I/S, Brondby (DK)

( * ) Notice: Subject to any disclaimer, the term of this patent is extended or adjusted under 35 U.S.C. 154(b) by 66 days.

(21) Appl. No.: 13/821,044

(22) PCT Filed: Nov. 10, 2011

(86) PCT No.: PCT/DK2011/050426
§ 371 (c)(1),
(2), (4) Date: May 20, 2013

(87) PCT Pub. No.: WO2012/062328
PCT Pub. Date: May 18, 2012

(65) Prior Publication Data
US 2013/0220468 A1    Aug. 29, 2013

Related U.S. Application Data

(60) Provisional application No. 61/422,292, filed on Dec. 13, 2010.

(30) Foreign Application Priority Data

Nov. 12, 2010    (DK) .................................. 2010 01031

(51) Int. Cl.
*G01B 11/16*    (2006.01)
*F16L 55/00*    (2006.01)
(Continued)

(52) U.S. Cl.
CPC ............. *F16L 55/00* (2013.01); *E21B 47/0006* (2013.01); *E21B 47/01* (2013.01); *F16L 11/081* (2013.01); *F16L 11/12* (2013.01); *G01L 1/242* (2013.01)
USPC ............................................. 356/32; 356/34

(58) Field of Classification Search
USPC ...................................................... 356/32, 34
See application file for complete search history.

(56) References Cited

U.S. PATENT DOCUMENTS 4,549,581 A    10/1985    Unno et al.
5,730,188 A    3/1998    Kalman et al.
(Continued)

FOREIGN PATENT DOCUMENTS

EP    1119684 A1    8/2001
EP    1255944 A1    11/2002
(Continued)

*Primary Examiner* — Roy M Punnoose
(74) *Attorney, Agent, or Firm* — Pearne & Gordon LLP

(57) ABSTRACT

The invention relates to a flexible pipe system comprising an unbonded flexible pipe having a center axis and a sensor system at least partly integrated in the unbonded flexible pipe. The unbonded flexible pipe has a length and a longitudinal direction along the length and comprises an inner sealing sheath and at least a first sensor containing armoring layer. The first sensor containing armoring layer comprises a plurality of elongated armoring elements arranged around the internal sealing sheath. The sensor system comprises: a plurality of optical fiber sensor units, at least one light pump for the optical fiber sensor units, a data collecting unit, and a computing unit. The optical fiber sensor units are optically connected to the data collecting unit, and the data collecting unit is in data communication with the computing unit. At least one of the elongated armoring elements of the first sensor containing armoring layer is a sensor containing element. The sensor containing elements each having integrated therein at least a part of one or more of the optical fiber sensor units, the optical fiber sensor units of the first sensor containing armoring layer extending along a monitoring length section of the flexible pipe, and the optical fiber sensor units being arranged to measure a change in strain of the respective sensor containing elements. The invention further relates to a method of detecting a break in an elongated armoring element.

35 Claims, 7 Drawing Sheets

(51) Int. Cl.
*E21B 47/00* (2012.01)
*E21B 47/01* (2012.01)
*F16L 11/08* (2006.01)
*F16L 11/12* (2006.01)
*G01L 1/24* (2006.01)

(56) References Cited

U.S. PATENT DOCUMENTS

| | | | |
|---|---|---|---|
| 5,813,439 | A | 9/1998 | Herrero et al. |
| 6,110,550 | A | 8/2000 | Jarrin et al. |
| 6,123,114 | A | 9/2000 | Seguin et al. |
| 6,145,546 | A | 11/2000 | Hardy et al. |
| 6,192,941 | B1 | 2/2001 | Mallen-Herrero et al. |
| 6,283,161 | B1 | 9/2001 | Feret et al. |
| 6,354,333 | B1 | 3/2002 | Dupoiron et al. |
| 6,408,891 | B1 | 6/2002 | Jung et al. |
| 6,454,897 | B1 | 9/2002 | Morand |
| 6,668,866 | B2 | 12/2003 | Glejbol et al. |
| 6,668,867 | B2 | 12/2003 | Espinasse et al. |
| 6,691,743 | B2 | 2/2004 | Espinasse |
| 8,547,539 | B2 * | 10/2013 | Ramos et al. ............... 356/73.1 |
| 2012/0222770 | A1 * | 9/2012 | Kristiansen et al. .......... 138/103 |

FOREIGN PATENT DOCUMENTS

| | | |
|---|---|---|
| EP | 1269057 A1 | 1/2003 |
| EP | 1269058 A1 | 1/2003 |
| EP | 1277007 A1 | 1/2003 |
| EP | 1384026 A1 | 1/2004 |
| EP | 1475650 A1 | 11/2004 |
| WO | 0017479 A1 | 3/2000 |
| WO | 0036324 A1 | 6/2000 |
| WO | 0151839 A1 | 7/2001 |
| WO | 0161231 A1 | 8/2001 |
| WO | 0161232 A1 | 8/2001 |
| WO | 0181809 A1 | 11/2001 |
| WO | 0242674 A1 | 5/2002 |
| WO | 02088659 A2 | 11/2002 |
| WO | 02090818 A1 | 11/2002 |
| WO | 2008077410 A1 | 7/2008 |
| WO | 2008113362 A1 | 9/2008 |
| WO | 2009106078 A1 | 9/2009 |
| WO | 2010028387 A2 | 3/2010 |

* cited by examiner

FLEXIBLE PIPE SYSTEM

The present invention relates to a flexible pipe system for the transport of hydrocarbons, such as transport of hydrocarbons to or from offshore installations, for example comprising transporting hydrocarbons under sea level. The flexible pipe system comprises an unbonded flexible pipe having a centre axis and a sensor system at least partly integrated in the unbonded flexible pipe.

The invention further relates to a method of detecting a break of an elongated armoring element of an unbonded flexible pipe.

Unbonded flexible pipes of the present type are well known in the art in particular for offshore transportation of fluids. Such pipes usually comprise an inner liner often referred to as an inner sealing sheath or an inner sheath, which forms a barrier against the outflow of the fluid which is conveyed through the pipe, and one or more armoring layers on the outer side of the inner liner (outer armoring layer(s)). An outer sheath may be provided with the object of providing a mechanical protection and/or for forming a barrier against the ingress of fluids from the pipe surroundings to the armoring layers.

As used in this text the term "unbonded" means that at least two of the layers including the armoring layers and polymer layers are not bonded to each other. In practice the known pipe normally comprises at least two armoring layers located outside the inner sealing sheath. In unbonded pipes, the armoring layers are not bonded to each other or to other layers directly or indirectly via other layers along the pipe. The pipe layers can therefore move relative to each other, and thereby the pipe becomes highly bendable, usable for dynamic applications e.g. as risers, and sufficiently flexible to roll up for transportation even when the layers are relatively thick, which is necessary for high strength pipes which should be able to withstand high pressure differences over layers of the pipe e.g. pressure differences between the pressure inside the bore of the pipe and the pressure on the outer side of the pipe.

In the standard usually applied for unbonded flexible pipes API specification 17 J "Specification for unbonded flexible pipe", third edition, published by American Petroleum Institute and API specification 17 B "Recommended Practice for Flexible Pipe" fourth edition published by American Petroleum Institute, additional information on the general state of the art of unbonded flexible pipes can be found.

Unbonded flexible pipes can be very long, and since the production of oil is performed at increasing deeper waters the length as well as the requirement to strength of the unbonded flexible pipe is increased as well. A main reason for the increased requirements is that the greater the depth at which a flexible pipe is to be used, the higher the requirements will be to strength against collapsing due to external pressure. Furthermore, the weight of the pipe during deployment and use may result in high tensile forces which increase with the length of the pipe and the depth at the deployment site. The higher the strength that needs to be provided, the more critical the integrity of individual tensile armoring elements becomes. Therefore, it is desirable to be able to monitor armoring layers for potential breaks in the armoring elements which could occur during use—even normal use of the pipe.

Therefore, it is an object of the invention to provide a new flexible pipe system and a method of detecting a break of an elongated armoring element of an unbonded flexible pipe that overcomes or ameliorates at least one of the disadvantages of the prior art or which provides a useful alternative thereto.

The layers of the flexible pipe of the invention such as the inner sealing sheath and layers surrounding the inner sealing sheath may be as described above and for example as known from the prior art. Also as described above the flexible pipe may in one embodiment comprise a carcass.

The unbonded flexible pipe of the flexible pipe system according to the invention may for example have a structure as described in any one of the documents EP 1255944, EP 1269057, EP 1384026, EP 1475650, EP 1277007, EP 1269058, EP 1119684, U.S. Pat. No. 6,123,114, U.S. Pat. No. 6,691,743, U.S. Pat. No. 6,668,867, U.S. Pat. No. 5,813,439, WO 0242674, U.S. Pat. No. 5,730,188, U.S. Pat. No. 6,354,333, U.S. Pat. No. 4,549,581, U.S. Pat. No. 6,192,941, U.S. Pat. No. 6,283,161, WO 0181809, WO 0036324, U.S. Pat. No. 6,454,897, U.S. Pat. No. 6,408,891 and U.S. Pat. No. 6,110,550, WO2009106078, WO 2008113362, EP 1937751, U.S. Pat. No. 6,145,546, U.S. Pat. No. 6,123,114 and U.S. Pat. No. 6,668,866 with the difference that the unbonded flexible pipe comprises a sensor containing layer with a sensor arranged as described herein.

The above-mentioned type of flexible pipes is used, among other things, for off-shore as well as for some on-shore applications for the transport of fluids and gases. Flexible pipes can e.g. be used for the transportation of fluids where very high or varying water pressures exist along the longitudinal axis of the pipe, such as riser pipes which extend partly or totally from the seabed up to an installation on or near the surface of the sea, pipes for transportation of liquid and gases between installations, pipes which are located at great depths on the seabed, or between installations near the surface of the sea. Such pipes are herein also referred to as harvesting pipes.

The term 'measure' in measure/measuring a parameter e.g. pressure includes both a direct measure as well as a measurement of a related parameter by which the parameter in question can be calculated. The terms 'measure' and 'determine' are used interchangeably.

An object of the invention is achieved by a flexible pipe system that comprises an unbonded flexible pipe having a centre axis. The flexible pipe system further comprises a sensor system at least partly integrated in the unbonded flexible pipe. The unbonded flexible pipe has a length and a longitudinal direction along the length and comprises an inner sealing sheath and at least a first sensor containing armoring layer. The first sensor containing armoring layer comprises a plurality of elongated armoring elements arranged around the internal sealing sheath. The sensor system comprises a plurality of optical fiber sensor units and at least one light pump for optically pumping the optical fiber sensor units. The sensor system further comprises a data collecting unit and a computing unit. The optical fiber sensor units are optically connected to the data collecting unit, and the data collecting unit is in data communication with the computing unit. At least one of the elongated armoring elements of the first sensor containing armoring layer is a sensor containing element. Each sensor containing element has integrated therein at least a part of one or more of the optical fiber sensor units. The optical fiber sensor units of the first sensor containing armoring layer extend along a monitoring length section of the flexible pipe, and are arranged to measure a change in strain of the respective sensor containing elements. In this way, the flexible pipe system is adapted to detect changes in strain that the elongated armoring elements experience, e.g. due to movements from waves etc., change in internal pressure, change in buoyancy of the pipe, or other influences. A special case of sudden change in strain may be caused by the breaking of an elongated armoring element. Such a failure reduces the residual strength of the flexible pipe and may ultimately result in catastrophic damage to the pipe. Therefore, in general a flexible pipe should be replaced after an elongated armoring element has broken, since this could indicate that other armoring elements may be at risk of breaking shortly.

It should be understood that not all of the sensor system need be arranged in the first sensor containing layer, but merely the parts of the optical fiber sensor units which perform the actual sensing. Other parts of the sensor system, such as parts of the optical fiber sensor units, the data collecting unit, computing unit and light pump need not and will often not be arranged in the first sensor containing layer or even in the unbonded flexible pipe, but will be connected to the sensing part of the optical fiber sensor units e.g. via the fiber. By arranging parts of the sensor system, such as the light pump, data collecting unit and computing unit, outside the flexible pipe, it is possible to avoid having electricity inside the pipe and thereby any risk of igniting liquid in the flexible pipe can be reduced or even avoided.

The sensitivity of the respective sensor units of the sensor system may be selected in relation to the structure and strength of the flexible pipe system and in relation to the security margin desired with respect to predicting and/or detecting armoring element break or other damage of the pipe. The sensitivity of the respective sensor units of the sensor system may in an embodiment be substantially identical, whereas in another embodiment the sensitivity of the respective sensor units of the sensor system differs from each other.

In an embodiment of the invention, the sensor system and/or at least one optical fiber sensor unit of the sensor system is/are capable of detecting a change in strain of about $30\mu$ strain or less, such as about $10\mu$ strain or less, or even about $5\mu$ strain or less. In this way, an optical fiber sensor is achieved which is sufficiently sensitive to measure at least some strain changing events in other elongated elements i.e. not only in the sensor containing element.

In an embodiment of the invention, the sensor system and/or at least one optical fiber sensor unit is/are capable of detecting a change in strain of about 1% or less, such as about 0.5% or less, such as about 0.2% or less, or even about 0.1% or less.

In an embodiment of the invention, the sensor system is arranged to detect a change of strain in an elongated element without a sensor unit connected to the sensor system. The elongated element without a sensor unit connected to the sensor system will for example comprise a fiber optical sensor not connected to the sensor system or it will for example be a secondary elongate element without an fiber optical sensor unit at all.

In an embodiment of the invention, the first sensor containing armoring layer comprises at least one elongated armoring element without an integrated fiber optical sensor unit for measuring strain, referred to as a secondary elongate element. Thus, the secondary elongated elements are not sensor containing elements. The sensor system is arranged to detect a change of strain in the at least one secondary elongated element. In case of an armoring element break, the strain in the broken element will be reduced in a vicinity of the break. Likewise, the remaining elongated armoring elements will as a consequence thereof sustain the extra load previously born by the broken element. Thus, the strain in the remaining elements increases after the break. In this way, an efficient monitoring system of the full sensor containing armoring layer may be achieved, without individually monitoring all elongated armoring elements.

In an embodiment of the invention, the sensor system is capable of detecting a break in any of the elongated armoring elements of the first sensor containing armoring layer. Thus, all the elongated armoring elements, including both the sensor containing elements and secondary elongated elements, of the first sensor containing armoring layer may be monitored to detect breaks. In this way, the need to individually monitor all armoring elements may be alleviated. Alternatively, redundancy may be introduced into the sensor system in this way.

In an embodiment of the invention, at least one of the sensor containing elements comprises one or more optical fiber sensor units integrated in the sensor containing element. One or more of the optical fiber sensor units may be rigidly fixed to the sensor containing element. In this way, the optical fiber sensor units may be protected from, e.g. mechanical wear, from other elements within the pipe. Furthermore, by rigidly fixing an optical fiber sensor unit a particularly sensitive strain measurement may be obtained.

In an embodiment of the invention, the optical fiber sensor units are arranged to extend in the respective longitudinal direction of the sensor containing elements. Thus, regardless of the arrangement of the elongated armoring elements, the optical sensor units follow the path of the elongated armoring elements. Consequently, the path followed by the optical fiber sensor units may be significantly longer than the monitoring length segment of the pipe, e.g. due to a typical helical winding of elongated armoring elements in unbonded flexible pipes.

The optical sensor unit(s) may in principle be integrated in the sensor containing element(s) by any method, for example by mechanical integration, integration using adhesive or combination thereof.

In an embodiment of the invention, at least one of the sensor containing elements is formed with a longitudinal groove to be filled with a solidifiable liquid material, and wherein the optical sensor unit is fixed in the groove by solidification of the liquid material. In this way, a particularly rugged arrangement of optical fiber sensor units is achieved.

In an embodiment of the invention, the solidifiable liquid material is a polymer material, such as an epoxy. In this way, a particularly strong adhesion of the optical fiber sensor units is obtained.

In an embodiment of the invention, the plurality of elongated armoring elements are helically wound around the internal sealing sheath with an angle relative to the centre axis of about 30 degrees or more, such as about 35 degrees or more. The elongated armoring elements are wound with an angle of about 60 degrees or less, such as about 55 degrees or less, or even about 45 degrees or less. In this way, the sensor system may efficiently monitor a tensile armoring layer in the flexible pipe.

The number of elongated armoring elements of the first sensor containing layer which comprises an integrated fiber optical sensor unit will be at least one and at most all elongated armoring elements and any variations there between is possibly.

In an embodiment of the invention, the number of sensor containing elements in the first sensor containing layer is about 90% or less of the number of elongated armoring elements of the first sensor containing armoring layer, such as about 50% or less, or even about 30% or less. The number of sensor containing elements in the first sensor containing layer is about 10% or more, such as about 15% or more of the number of elongated armoring elements of the first sensor containing armoring layer. Thus, a cost-effective sensor system may be achieved by only directly monitoring a part of the elongated armoring elements.

In an embodiment of the invention, the number of sensor containing elements in the first sensor containing layer is about 35 or less, such as about 20 or less, or even about 16 or less. The number of sensor containing elements in the first sensor containing layer is about 4 or more, such as about 6 or more. Thus, a cost-effective sensor system may be achieved by only directly monitoring a part of the elongated armoring elements.

In an embodiment of the invention, the number of optical fiber sensor units in the first sensor containing layer is about 90% or less of the number of elongated armoring elements of the first sensor containing armoring layer, such as about 50% or less, or even about 30% or less. The number of optical fiber sensor units in the first sensor containing layer is about 10% or more, such as about 15% or less of the number of elongated armoring elements of the first sensor containing armoring layer. Thus, a cost-effective sensor system may be achieved by only directly monitoring a part of the elongated armoring elements.

In an embodiment of the invention, the number of optical fiber sensor units in the first sensor containing layer is about 35 or less, such as about 20 or less, or even about 16 or less. The number of sensor containing elements in the first sensor containing layer is about 4 or more, such as about 6 or more. Thus, a cost-effective sensor system may be achieved by only directly monitoring a part of the elongated armoring elements.

In an embodiment of the invention, the sensor containing elements are distributed with an approximately uniform angular distance in a cross section of the pipe. In this way, an improved sensitivity in the cross section is achieved for a given number of sensor containing elements.

In an embodiment of the invention, the optical fiber sensor units in the first sensor containing layer are distributed with an angular distance between any two neighboring optical fiber sensor units in a cross section of the pipe of at least about 15 degrees, such at least about 30 degrees, or even such as about 45 degrees. The angular distance is less than about 90 degrees, such as less than about 60 degrees. In this way, an efficient monitoring of the entire first sensor containing layer may be obtained with a reduced number of optical sensor units, compared to a case where all elongated elements are monitored.

In an embodiment of the invention, at least one of the sensor containing elements comprises at least a first optical fiber sensor unit and a second optical fiber sensor unit. The first optical fiber sensor unit is capable of measuring strain in the sensor containing element, and the second optical fiber sensor unit is capable of measuring one or more additional parameters of the flexible pipe or surroundings of the flexible pipe, such as temperature, pH-value, acceleration, deflection, etc. In this way, the sensing capabilities of the sensor system may be extended without limiting the ability of the sensor system to monitor the first sensor containing layer. Naturally, the second optical fiber sensor unit may also be partly integrated in a secondary elongated element, i.e. an element without an optical fiber sensor unit for sensing a strain.

In an embodiment of the invention, the second optical fiber sensor is a temperature sensor capable of measuring a temperature preferably in a multitude of measurement points along a length of the flexible pipe. In this way, a flexible pipe system may be achieved that is able to detect a variety of events which may have a detrimental effect on the operating lifetime of the flexible pipe.

In an embodiment of the invention, the multitude of measurement points has a longitudinal separation of about 0.2 m or more, such as about 0.5 m or more, or even about 0.7 m or more. The longitudinal separation being about 5 m or less, such as about 2 m or less, or even about 1.5 m or less. Thus, a detailed measurement of the temperature profile along the flexible pipe may be achieved.

In an embodiment of the invention, the temperature sensor is capable of measuring the temperature in the multitude of measurement points with a resolution of about 2° C. or better, such as about 1.5° C. or better, or even such as about 1° C. or better.

In an embodiment of the invention, the data collecting unit and/or the computing unit is capable of detecting a local temperature variation. In this way, the flexible pipe system may e.g. be used to monitor the flexible pipe for a possible flooding of the annulus of the pipe. The annulus comprises the volume of the pipe between the inner sealing sheath and the optional outer sheath. In case the outer sheath suffers a leak, the generally relatively cool surrounding sea water may enter through the leak. This would be registered as a local decrease in temperature, detectable in the distributed temperature measurement at the nearest measuring points to the damage. The water entering the annulus through the leak will eventually fill the annulus for all parts of the pipe being below the sea level external to the pipe. A leak will result in an inflow of seawater, which generally has a lower temperature than the annulus. Thus, the leak may be observed in the temperature measurements as a cool spot. If the leak is minor so that only minor volumes of water enter, the cooling effect may be too small to be directly observable in the temperature measurement. However, the presence of water in the annulus will change the insulating properties of the pipe by increasing the thermal conductivity and thus change the radial temperature distribution so that the annulus temperature in a water-filled annulus will be higher than in an air-filled annulus. Therefore, the temperature measurements may also be used to determine how long a length of the pipe annulus has been filled with water, either from leaks or from diffusion or condensation.

According to a broader aspect of the invention, in one embodiment the flexible pipe system does not comprise any first optical fiber sensor units for measuring strain, but comprises at least one second optical fiber sensor unit capable of measuring temperature in a multitude of measurement points along the length of the flexible pipe. In this way, a pipe without a strain measurement system may still be monitored for leaks or ruptures of the outer protective sheath.

In an embodiment of the invention, the monitoring length section is substantially the length of the flexible pipe. Thus, a complete monitoring of the full pipe may be achieved.

In an embodiment of the invention, the monitoring length section is a part of the length of the flexible pipe. In this way, a critical section of the pipe with particular importance or with especially high loads may be monitored, without the added cost of monitoring the full length of the pipe.

In an embodiment of the invention, the monitoring length section is about 15% or less of the length of the pipe, such as about 10% or less, or even about 5% or less. Often, high load regions of the pipe are of a relatively short length. Thus, in such cases it is sufficient to monitor the high load regions.

In an embodiment of the invention, the flexible pipe system comprises a riser, the unbonded flexible pipe being the riser. In this configuration, the tensile armor is particularly loaded due to the weight of the pipe. Therefore, it is advantageous to monitor the tensile armor in a riser.

In an embodiment of the invention, the riser has a top end in proximity to sea surface, the monitoring length section of the riser measured from the top end is about 400 m or less, such as about 200 m or less, such as about 100 m or less, or even about 50 m or less. A riser is subjected to high loads due to the weight of the pipe and due to the influence of waves in the top. Thus, it is advantageous to monitor the top part of a riser.

In an embodiment of the invention, the flexible pipe system comprises a jumper, a flow line, or an umbilical, being comprised as the unbonded flexible pipe. Other types of flexible pipe systems may also is subjected to high loads, which may advantageously be monitored by the sensor system.

In an embodiment of the invention, at least one optical fiber sensor unit is capable of measuring strain in multiple positions in the longitudinal direction with a longitudinal resolution. In this way, the sensor system is able to detect breaks of armoring elements over an extended range of the flexible pipe.

In an embodiment of the invention, the sensor system is capable of measuring strain in the at least one optical fiber sensor unit with the longitudinal resolution being about 5 m or better, such as about 3 m or better, or even such as about 1 m or better. Thus, an improved resolution of the sensor system is achieved. E.g. by detection of strain with a relatively high longitudinal resolution, a possible break in an armoring element may be detected in multiple strain measuring points/ranges. In this way, the identification of an event as a break may be improved. Furthermore, a relatively high longitudinal resolution may enable an accurate location of a break, e.g. as an aid in post break inspection of a retrieved pipe. Furthermore, the correct identification of an event as a wire break may be improved by correlating measurements from multiple optical fiber sensor units and fitting the measurements to a known wire break profile. The wire break profile may, e.g. be based on measurements of wire breaks in other pipes in use and/or from pipe tests.

In an embodiment of the invention, at least one optical fiber sensor unit is capable of distributed measurements in the longitudinal direction. In this way, a relatively simple optical fiber sensor unit is integrated into the sensor containing element, typically an ordinary optical fiber. Thus, the sensor system may later be upgraded by an upgrade of one or more of the optical pumps, the data collecting unit and/or the computing unit, without requiring the optical fiber sensor unit within the pipe to be upgraded. Additionally, distributed measuring may provide a high longitudinal resolution of the strain measurement compared to lumped or quasi-distributed measurements, and may furthermore enable an improved measurement distance, i.e. enable measurements along a longer piece of pipe.

In an embodiment of the invention, at least one of the optical fiber sensor units comprises a number of optical fiber sensors, the number of optical fiber sensors being distributed along the monitoring length section. The number of optical fiber sensors of the at least one optical fiber sensor unit is optically connected by an optical fiber link. The optical fiber link is in optical communication with the light pump and is in data communication with the data collecting unit. By use of such a quasi-distributed or lumped sensor system, a relatively high sampling rate may be achieved. Additionally, the longitudinal resolution may be directly controlled by controlling the distance between subsequent optical fiber sensors along the optical fiber link. In this way, both a relatively high sampling rate and a high longitudinal resolution may be achieved simultaneously.

In an embodiment of the invention, at least one of the optical fiber sensor units comprises an optical fiber running along the full monitoring length section. A number of optical fiber sensors are located along the optical fiber. The optical fiber is configured for distributing an optical signal to the optical fiber sensors and for collecting a measurement response from the optical fiber sensors. In this way, a simple system may be achieved in which a single optical fiber may connect a multiple of optical fiber sensors being distributed along the optical fiber. Such a system would be convenient to install in the elongated armoring element, since the need for individually connecting the optical sensors to the optical pump and/or the data collecting unit is alleviated.

In an embodiment of the invention, the number of optical fiber sensors is approximately equidistantly distributed along the monitoring length section.

In an embodiment of the invention, the longitudinal resolution corresponds substantially to a spacing of subsequent optical fiber sensors along the longitudinal direction.

In an embodiment of the invention, the number of optical fiber sensors comprises fiber Bragg gratings. Bragg gratings are relatively robust and compact strain sensors which may be deployed in significant numbers in a quasi-distributed configuration along a single optical fiber.

In an embodiment of the invention, the number of optical fiber sensors is about 2 or more, or about 4 or more, such as about 6 or more, or even about 8 or more, the number being about 100 or less, or about 60 or less, such as about 40 or less, or even about 25 or less.

In an embodiment of the invention, the sensor system is capable of measuring strain with a sampling rate of around 10 Hz or more, such as around 100 Hz or less, even around 250 Hz or less, or even around 1 kHz or less. A break in an armoring element will relax the strain in the broken element, and redistribute this strain in the remaining armoring elements. This strain redistribution happens on a short time scale. Therefore, a high sampling rate is advantageous to identify a break event from other phenomena which influence strain in the armoring elements.

In an embodiment of the invention, the optical fiber sensor units are capable of being sampled with a sampling rate of around 10 Hz or less, such as around 100 Hz or less, even around 250 Hz or less, or even around 1 kHz or less.

In an embodiment of the invention, the data collecting unit is capable of sampling the optical fiber sensor units with a sampling rate of around 10 Hz or less, such as around 100 Hz or less, even around 250 Hz or less, or even around 1 kHz or less.

In an embodiment of the invention, the data collecting unit and the computing unit are integrated to a data collecting and computing unit. This achieves a compact sensor system.

In some embodiments, the data collecting unit comprises a data pre-processing unit for pre-processing the measurement data before the measurements are transferred to the computing unit. Such a pre-processing unit may e.g. be a dedicated circuit, for example for performing a numerical differentiation of the raw measurement data.

In an embodiment of the invention, the light pump and/or a pump light signal from the pump is controlled by the data collecting unit and/or the computing unit. For example, the pump signal may be modulated to improve sampling rate, measurement sensitivity, longitudinal resolution or other properties of the flexible pipe system. Such a modulation may preferably be controlled by the data collecting unit and/or the computing unit.

In an embodiment of the invention, the flexible pipe further comprises a second sensor containing armoring layer comprising a plurality of elongated armoring elements arranged around the internal sealing sheath. At least one of the elongated armoring elements of the second sensor containing armoring layer is a sensor containing element. In this way, both the first sensor containing layer and the second sensor containing layer may be monitored for wire breaks. The optical fiber sensor units of a sensor containing layer may be largely unaffected by break events in other armoring layers. Thus, it may be necessary to individually monitor any armoring layer which is to be monitored. The second sensor containing layer may be provided according to the description of the first sensor containing layer in any of the embodiments above.

In an embodiment of the invention, the first sensor containing armoring layer and second sensor containing armoring layer are comprised as elongated armoring elements helically wound with approximately numerically equal angles in the two layers with respect to the centre axis but the angles having opposite signs. Thus, it is possible to monitor at least two tensile armoring layers in a pipe using the inventive system.

In an embodiment of the invention, the optical fiber sensor unit of the second sensor containing armoring layer is optically connected to a second data collecting unit. The second data collecting unit is in data communication with the computing unit and/or a second computing unit. Alternatively, the optical fiber sensor units of the second sensor containing armoring layer may be optically connected to the data collecting unit.

In an embodiment of the invention, the second data collecting unit and the second computing unit are integrated to a second data collecting and computing unit.

In an embodiment of the invention, the flexible pipe system further comprises an end fitting being connected to an end of the unbonded flexible pipe. The sensor system is capable of detecting a change in tension within the end fitting. In this way, the end fitting may also be monitored for changes in strain, possibly being due to a break, damage, fatigue, etc.

An objective of the invention is achieved by a method for detecting a break of an elongated armoring element of an unbonded flexible pipe. The unbonded flexible pipe has a centre axis, a length and a longitudinal direction along the length and comprising an inner sealing sheath and at least a first armoring layer. The first armoring layer comprises a plurality of the elongated armoring elements arranged around the inner sealing sheath. The method comprises:
- fastening strain sensing means to a number of the elongated armoring elements, the number of elongated armoring elements being sensor containing elements,
- obtaining a measurement time series by periodically measuring strain in the sensor containing elements by use of the strain sensing means and a data collecting unit,
- generating a processed time series by a processing of the measurement time series with a computing unit, and
- detecting breaks by comparing the processed time series with one or more threshold value(s). Thus, an efficient monitoring of breaks in the first armoring layer is achieved. Any additional armoring layers in the pipe may naturally also be monitored in an analogous way. The measurement time series should extend over the full time for which monitoring of the pipe is desirable, e.g. for the full life time of the pipe. The individual measurements that together form the measurement time series should be performed sufficiently often to sample a temporal response of a break of an elongated armoring element. Thus, the measurement time series should preferably be performed with a sampling rate as mentioned above for the flexible pipe system.

In one embodiment of the inventive method, the elongated armoring elements are helically wound around the internal sealing sheath with an angle of about 30 degrees or more relative to the centre axis, such as about 35 degrees or more, the angle being about 60 degrees or less, or about 55 degrees or less, or even such as about 45 degrees or less. In this way, the detection method may be adapted to monitor a tensile armoring layer of an unbonded flexible pipe.

In one embodiment of the inventive method, the strain sensing means comprises optical fiber sensor units. Such sensor units are especially suitable for use in pipes, e.g. due to their compact size, and the possibility of distributed or quasi-distributed measurements over a length of the optical fiber.

In one embodiment of the inventive method, the processed time series is a first time derivative of the measurement time series. Since break events are generally of a much shorter duration than other strain-changing events the pipe may encounter, the time derivative of the measurement time series will tend to emphasize break events. Furthermore, the mean value of the processed time series becomes zero, which alleviates this entity from the comparison.

In one embodiment of the inventive method, the processed time series is a second time derivative of the measurement time series. Taking the second time derivation of the measurement time series emphasizes break events even further, thus leading to an easier detection of such events.

In one embodiment of the inventive method, the threshold value is a constant. In this way, a simple selection criterion is obtained. The selection criterion may either be used to report a wire break or may e.g. be used to initiate further steps to classify an event as a wire break or as another event.

In one embodiment of the inventive method, the threshold value is a computed value, such as a moving average or the like. In this way, the method may take long-term variations in the measured strain into account.

In one embodiment of the inventive method, the detection of breaks comprises:
- calculating a sample standard deviation and a mean of the processed time series over a moving time slot,
- calculating a signal-to-noise ratio from a value of the processed time series divided by the calculated sample standard deviation,
- observing if signal-to-noise ratio exceeds a decision value.

In this way, a simple criterion for detecting a break is achieved. The decision value is typically around 2 or more. Other values may however be chosen to adjust the statistical confidence level. The length of the moving time slot should preferably be selected to allow for adaptation of the measurements to long-term changes in the pipe during operation.

In some embodiments of the method, multiple criteria may be combined to a combined decision criterion, e.g. by both observing if the absolute values of the processed time series exceeds a corresponding threshold value, and if a signal-to-noise ratio of the processed time series exceeds a threshold value for this parameter. In this way, a more robust detection of wire break events may be achieved. Likewise, a combination of multiple processed time series, e.g. based on both the first time derivative and the second time derivative, may be used as the combined decision criterion.

In one embodiment of the inventive method, the method further comprises:
- if a break is indicated by the threshold value having been exceeded for a first strain sensing means and a processed time series of at least one neighboring strain sensing means also shows that the threshold value has been exceeded:
- comparing the processed time series to a wire break signature.

In this way, the risk of detecting false positives, i.e. the method reporting false breaks while no break has occurred, may be minimized. In some embodiments of the method, an extra step may be applied for events which fall just outside the indications of a break, i.e. "close calls". Such a test may be to monitor the average strain levels for subsequent increase after the possible break event.

In one embodiment of the inventive method, the method is performed using the inventive flexible pipe system according to any of the abovementioned embodiments.

An object of the invention is achieved by use of the flexible pipe system for detecting a flooding of an annulus or for detecting a rupture of an outer sheath.

The invention will be explained more fully below in connection with a preferred embodiment and with reference to the drawings in which.

Figure 3:
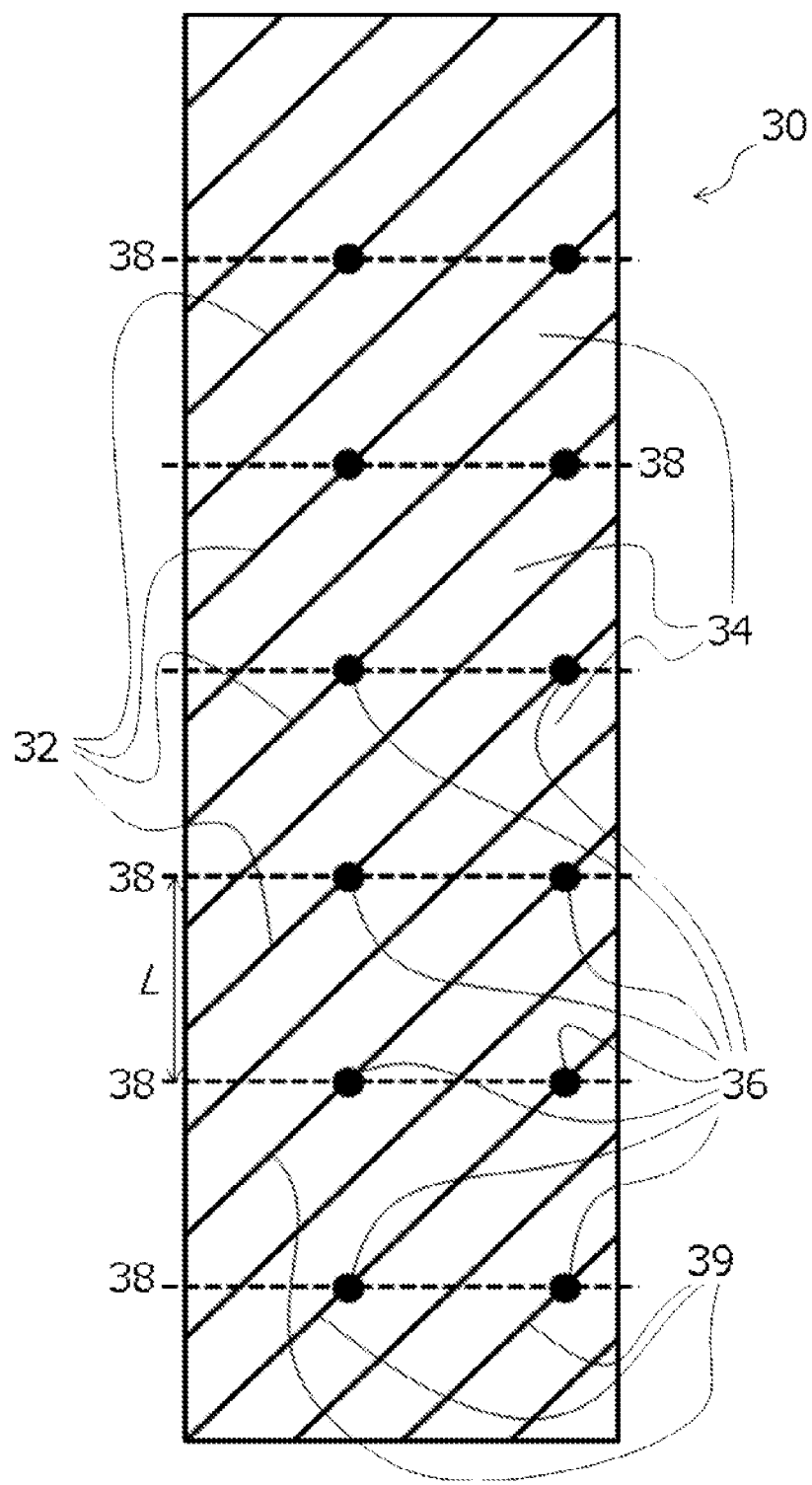
Figure 4A:
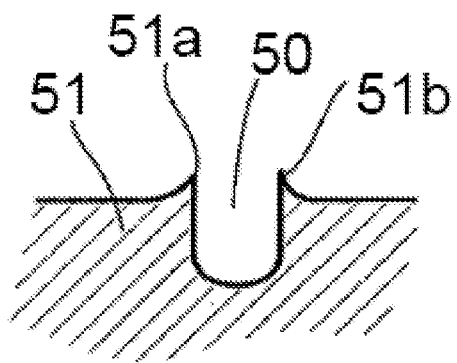
Figure 4B:
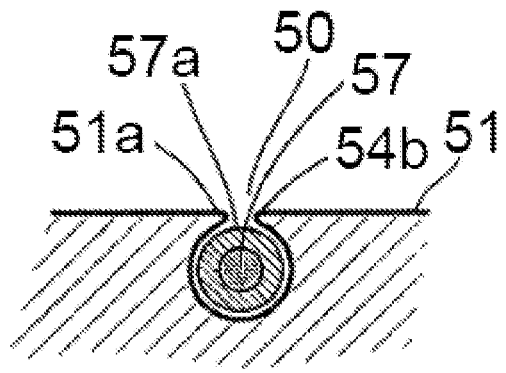
Figure 7A:
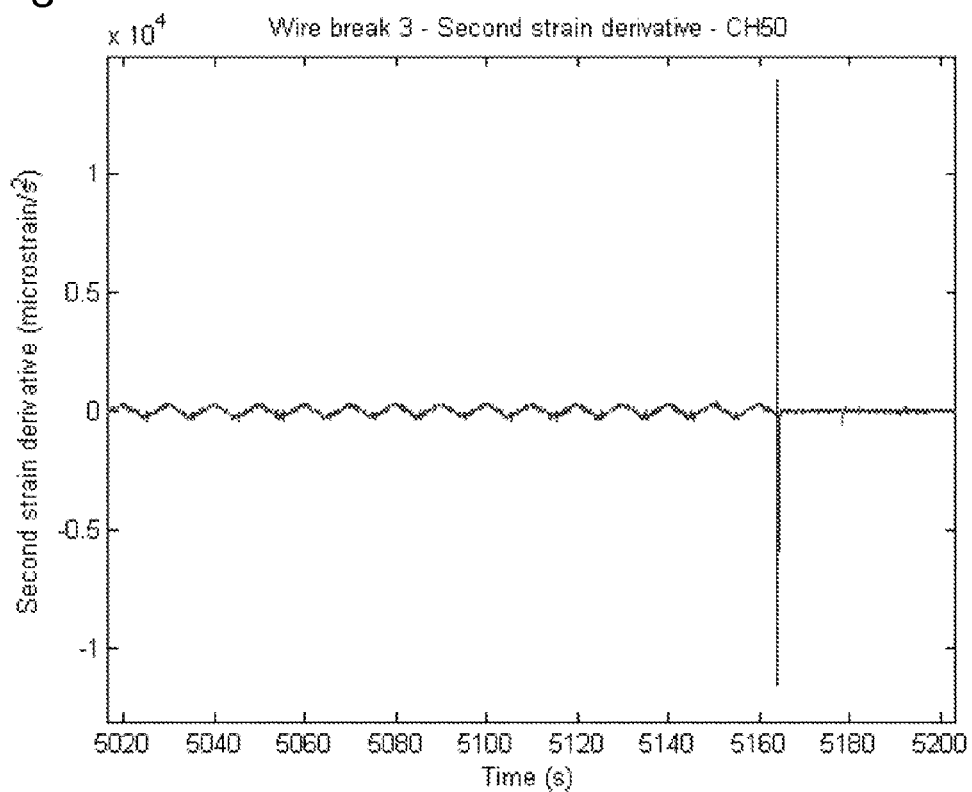
Figure 7B:
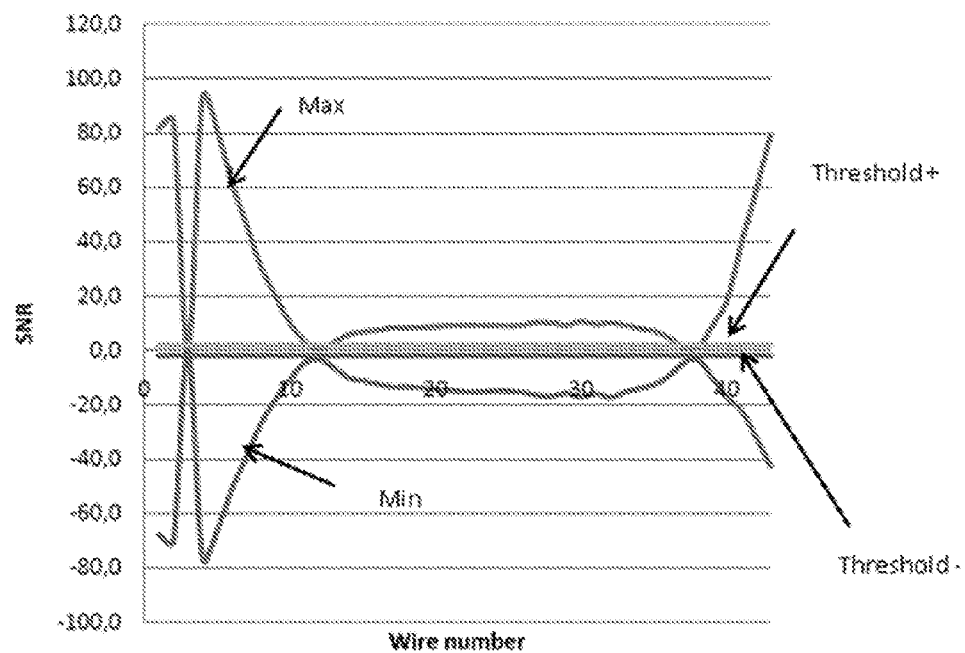
Figure 8:
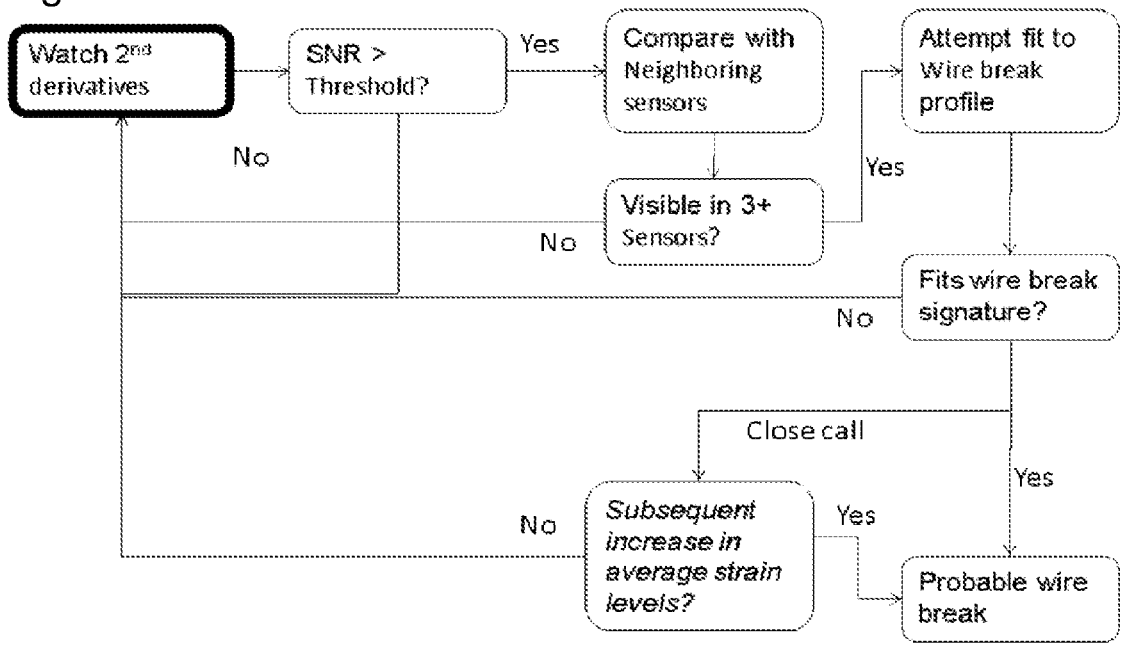

FIG. 3 is a schematic side view of a flexible pipe and illustrates paths of optical fiber sensor units and locations of optical fiber sensors, FIGS. 4a and 4b are cross-sectional views of a section of a reinforcement element of an internal armoring layer of a flexible pipe, where a fiber sensor is arranged, FIGS. 5, 6, and 7 show data from the experiment of example 1, and FIG. 8 illustrates a method of detecting a wire break.

The figures are schematic and may be simplified for clarity. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
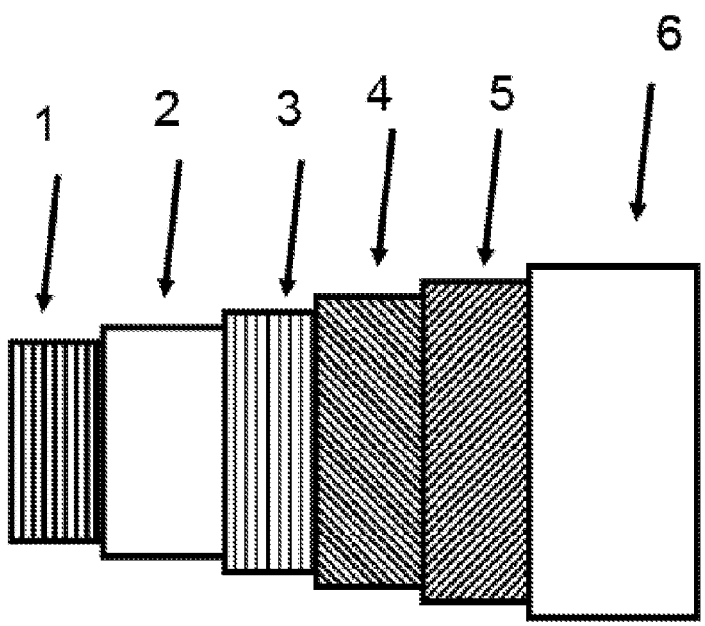
FIG. 1 is a schematic side view of a flexible pipe with a carcass.

The flexible pipe shown in FIG. 1 comprises an inner sealing sheath 2, often also called an inner liner, e.g. of cross linked poly ethylene (PEX). Inside the inner sealing sheath 2 the pipe comprises an internal armoring layer 1, called a carcass. On the outer side of the inner sealing sheath 2, the flexible pipe comprises three outer armoring layers 3, 4, 5. The outer armoring layer 3 closest to the inner sealing sheath 2 is a pressure armoring layer 3, made from profiles and/or strips wound with a short pitch and thereby at a steep angle to the centre axis of the pipe, e.g. close to 90 degrees. Around the pressure armoring layer 3, the pipe comprises a pair of cross wound tensile armoring layers 4, 5, made from wound profiles and/or strips. The tensile armoring layers 4, 5 are normally cross wound with equal or different angles of 70 degrees or less, typically 60 degrees or less, such as 55 degrees or less, such as between 20 and 55 degrees. The pipe further comprises an outer polymer layer (outer sheath) 6 protecting the armoring layer mechanically and/or against ingress of sea water. The materials used are well known in the art.

Between the inner sealing sheath 2 and the outer sheath is provided an annulus, also called an annulus cavity. In this annulus cavity the pressure armoring layer 3 and the tensile armoring layers 4, 5 are placed. The armoring layers are not fluid tight.

The flexible pipe is a harvesting pipe for transporting oil, gas or similar fluids from a well to a collecting unit such as a sea surface installation (usually a ship or a platform). A bore defined by the inner sealing sheath 2 (i.e. the area surrounded by the inner side of the inner sealing sheath) provides a transportation path. The internal armoring layer 1 is placed in the bore. Optical fiber sensor units are arranged at least partially integrated with a number of elongated armoring elements of the inner and/or outer tensile armoring layers 4, 5.

Figure 2:
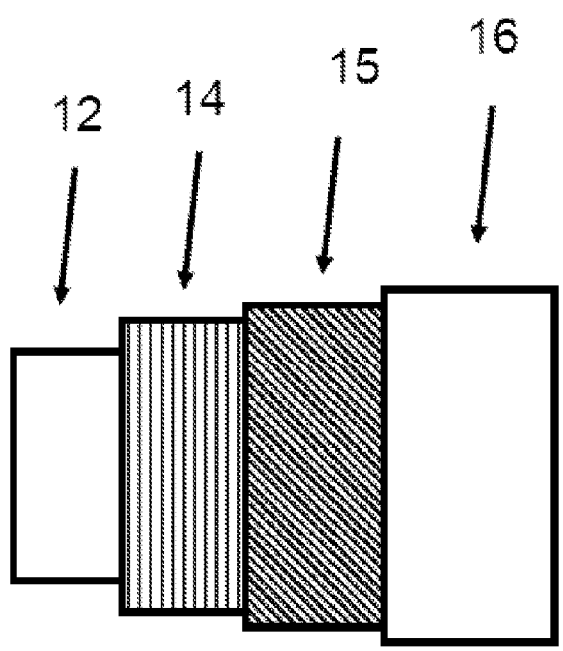
FIG. 2 is a schematic side view of a flexible pipe without a carcass.

FIG. 2 shows another pipe design. This flexible pipe comprises an inner sealing sheath 12 and a pair of outer armoring layers, 14, 15, in the form of profiles and/or strips wound around the inner sealing sheath 12. The two armoring layers are cross wound at an angle to the centre axis of the pipe of close to 55 degrees, typically one of the layers is wound at an angle slightly less than 55 degrees, e.g. between 52 and 55 degrees, and the other one of them is wound at an angle slightly more than 55 degrees e.g. between 55 and 57. The pipe further comprises an outer polymer layer 16 protecting the armoring layer mechanically and/or against ingress of sea water.

Between the inner sealing sheath 12 and the outer sheath is provided an annulus, also called an annulus cavity. In this annulus cavity the outer armoring layers 14, 15 are placed. The armoring layers are not fluid tight.

Also this pipe may be a harvesting pipe as described above and comprises a bore defined by the inner sealing sheath 12, which provides a transportation path. Optical fiber sensor units are arranged as described above.

FIG. 3 illustrates paths of optical fiber sensor units 32 along a length of a flexible pipe 30. Note that the optical fiber sensor units 32 are integrated in the sensor containing armoring elements 34, but are here illustrated separated from the armoring elements 34 for clarity. Also indicated are the locations of the optical fiber sensors 36, where the actual measurements are performed. The optical fiber sensors 36 belonging to different sensor containing armoring elements 34 are here shown to have optical fiber sensors 36 arranged in approximately coinciding cross sections 38 of the flexible pipe 30. Thus, multiple strain measurements may be obtained at these cross sections 38 along the monitoring length of the flexible pipe 30. In an alternative embodiment, the optical fiber sensors of different optical fiber sensor units are not arranged to coincide. The optical fiber sensors 36 in each of the optical fiber sensor units 32 are interconnected with each other and with the data collecting unit (not shown) via a fiber optic link 39. The fiber optic link 39 is here a conventional optical fiber. In principle any type of optical fiber strain sensors could be employed, but fiber Bragg gratings are particularly advantageous for this use.

Furthermore, FIG. 3 illustrates the paths of selected sensor containing elements in the form of tensile armoring wires in a tensile armoring layer. The optical fiber sensor units are integrally arranged in the wires and thus follow the paths of the wires along the length of the pipe. Also indicated in the figure are locations of optical fiber sensors. Note that the distance L between subsequent groups of sensors may be chosen to achieve a sufficient sensitivity of the sensor system, i.e. so that a break occurring half way between two groups of sensors is still detected by at least one of the groups. However, the distance L between subsequent groups of sensors should not be chosen too small due to the excessive number of optical fiber sensors which would otherwise be needed.

FIGS. 4a and 4b are cross-sectional views of a section of a reinforcement element 51 of an internal armoring layer of a flexible pipe, where a fiber sensor 57 is arranged. FIG. 4a shows the reinforcement element 51 prior to arranging the fiber sensor 57 therein. A channel shaped cavity 50 has been formed in the reinforcement element 51. The channel shaped cavity 50 has protruding edges 51a, 51b. The fiber sensor 57 is arranged in the cavity 50 of the reinforcement element 51 where after the protruding edges 51a, 51b are folded around the fiber sensor to fix and thereby integrate the fiber sensor 57 in the reinforcement element 51. The final result is illustrated in FIG. 4b. Here, the outer surface 57a of the fiber sensor 57 comes in contact with the inner surface 54b of the cavity 50.

EXAMPLE 1

To investigate the requirements for detecting a break in a tension armoring element, a 11 m length of an 6" unbonded flexible pipe was subjected to a tension-tension test procedure, in which the test pipe was subject to a sinusoidally varying tension with a period of 10 s. The outermost tensile armoring layer of the test pipe was instrumented with conventional strain gages on all tension wires 1 m from one end fitting of the pipe. All strain gages were sampled with 10 Hz for the duration of the test. Furthermore, the test pipe was monitored with a three-axis accelerometer to register possible breaks. Whenever the pipe acceleration exceeded a threshold value, it was taken as an indication of a wire break and the test was paused. Then x-ray examination was used to confirm the presence and location of the wire break. The time of the accelerometer event was used to look for event indicators in the strain data. During the test, two wire breaks occurred in the outer tensile armoring layer, in the wires number 3 and 32. Additionally, three wire breaks occurred in the inner tensile armoring layer, which was not instrumented. The test pipe had a total of 43 tensile armoring wires in the outermost tensile armoring layer, which was monitored in the test.

Figure 5A:
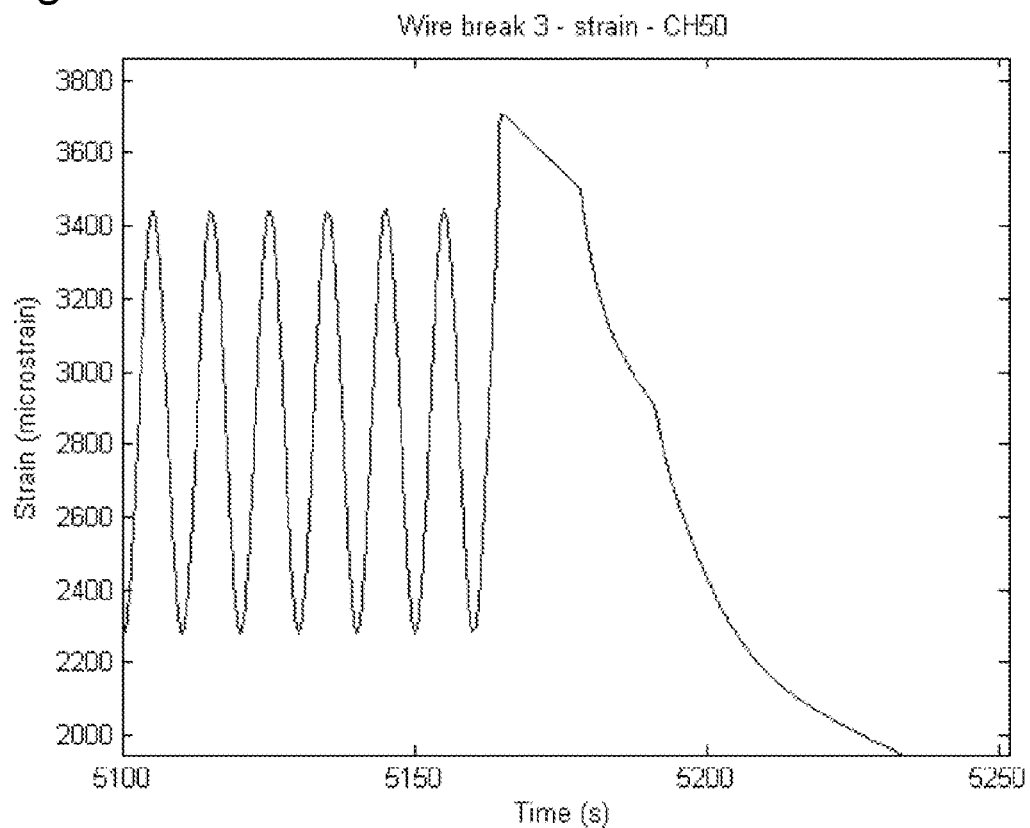

FIG. 5a shows the measured strain in wire number 1 at a time window around the wire break in wire number 3. It is noted that the wire break is clearly observed two wires away from the broken wire. The sinusoidal change in the strain mirrors the movement of the test bench. The wire break event shows up as a sudden increase in strain at the point of maximum strain in a tension cycle.

Figure 5B:
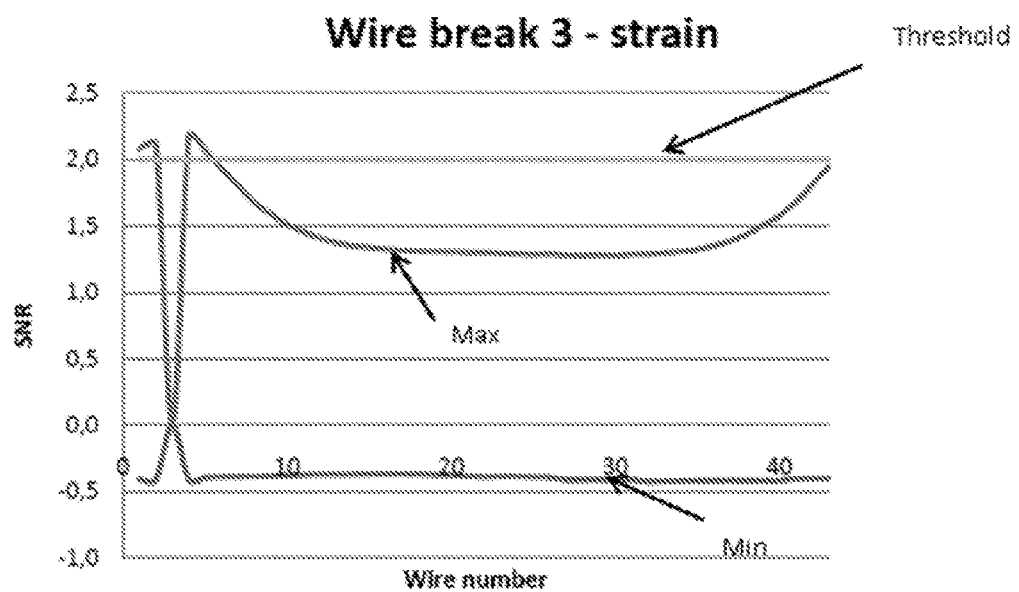

FIG. 5b shows the signal to noise ratio (SNR) calculated from the measured strain data for all the instrumented wires. In this test, the mean and sample standard deviation of the strain was calculated based on the data from the load cycle in which the wire break occurred (here in the time slot from 5160 s-5170 s in the measurement data). The sample standard deviation of the signal corresponds to the noise contribution of normal pipe movements to the measured strain. The strength of an event is defined as the highest amplitude of the event compared to the noise level. Thus, a difference between a measured peak and the mean strain of 3 times the sample standard deviation results in a SNR value of 3. This calculation has been performed on the strain data from all the strain gages to produce the plot in FIG. 5b. A SNR threshold value of 2 is selected for the signal to be significant. As seen in the figure, the break event is noticeable in a few of the wires neighboring the break. However, measurements on most of the wires would not detect the break.

Figure 6A:
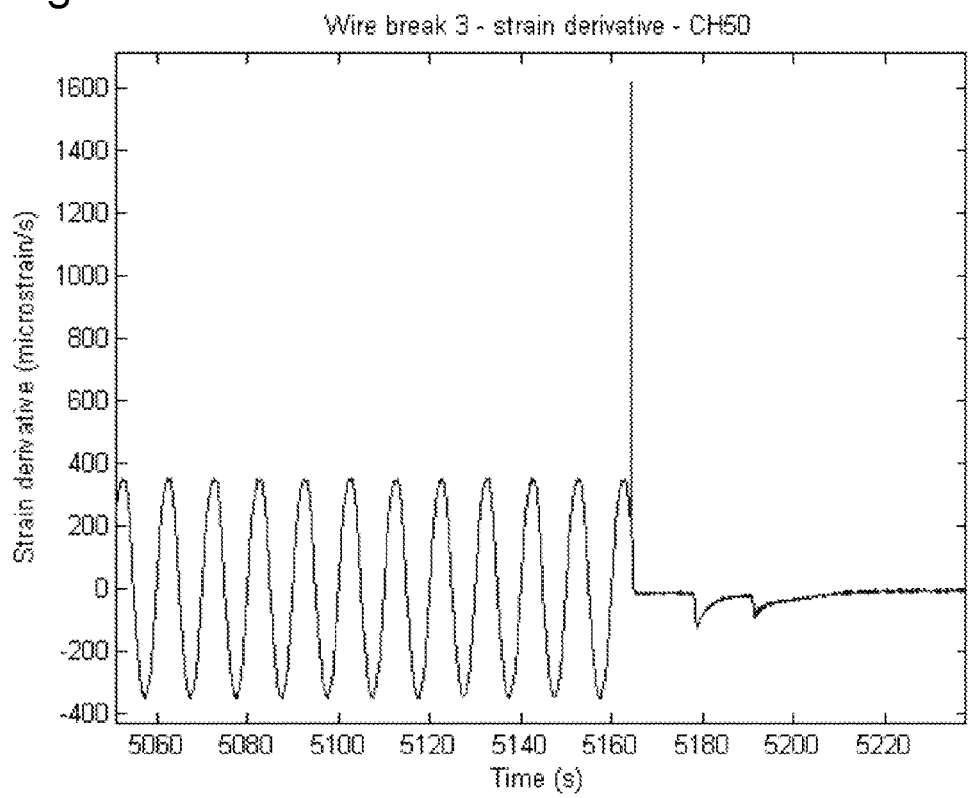

FIG. 6a shows the first time derivative of the measurement data shown in FIG. 5a. Since the time scale of the break event is much shorter than the other variations in the measured data, the break shows up as a pronounced peak in the derivative data.

Figure 6B:
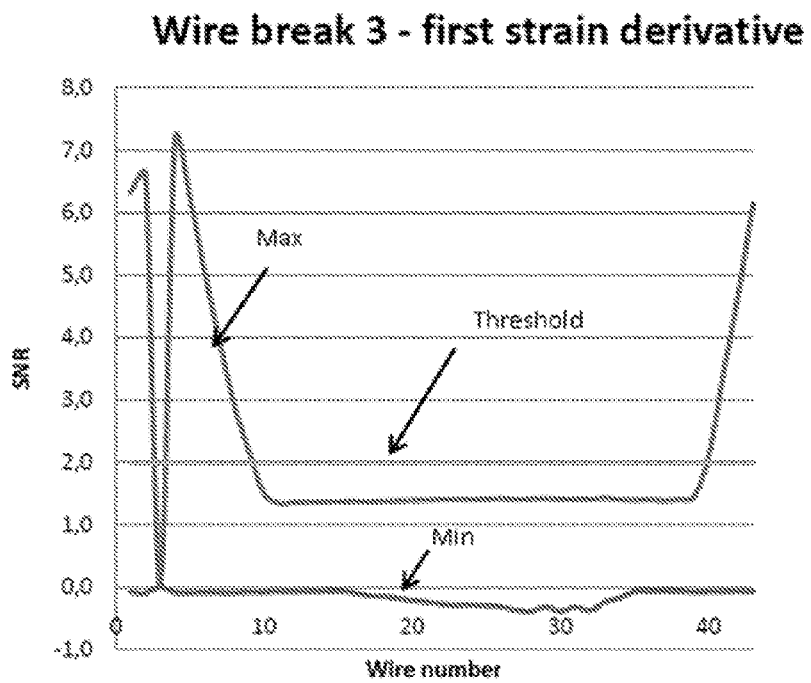

FIG. 6b shows the SNR values calculated from the first derivatives of the measured strain data series, analogously to FIG. 5b. Here it is seen that the SNR values observed for the break event are approximately 3.5 times stronger than seen directly in the strain data in FIG. 5b. In this way, the break may be observed in 4-5 wires on either side of the broken wire, when still applying a threshold value of 2.

FIGS. 7a and 7b illustrate data from the second time derivative of the measurement data shown in FIG. 5a and the corresponding calculated SNR values. Compared to FIG. 6a, an even more pronounced peak is observed. As seen in FIG. 7b, the wire break is observed far above the threshold value in the signals from nearly all wires. This clearly illustrates that only part of the tensile armoring wires need to be monitored to achieve a complete monitoring for breaks in a tensile armoring layer.

Note that the strain gages were sampled with 10 Hz, which is slow compared to the event duration, i.e. insufficient to fully sample the actual break event. Therefore, the first and second time derivative calculated from the strain data are underestimated by these measurements. Thus, a faster sampling rate will increase the peak value observed in the first and second time derivative values and thus result in a stronger event signature in the observed data.

An additional wire break in the outer tensile armoring layer occurred during the test. The results from this break were largely identical to what was described above and will therefore not be described here. Furthermore, three wire breaks occurred in the inner tensile armoring layer. No evidence of these breaks was found in the strain data from the outer tensile armoring layer. Thus, this test highlights the need to instrument both the inner and outer tensile armoring layer, if both are to be monitored. Naturally, this extends to any further tensile armoring layers which may be present in the pipe.

FIG. 8 illustrates a method for detecting a break in a tensile armoring wire of a flexible pipe. The method may be used in the flexible pipe system as described above. Observation of a SNR value of the second time derivative of a strain measurement in one wire exceeding a threshold value indicates a possible wire break. Therefore, data from the neighboring wires are studied for any markers in the second time derivative values. Together, the FIGS. 5b, 6b, and 7b indicate a wire break profile. If the observed event is visible in data from more than 3 sensors, the measured strain signatures are fitted to the wire break profile. In this way, it is possible to distinguish a wire break from another event in the strain data, such as a so-called stick-slip event, where one or more tensile armoring wires become stuck in a position before they suddenly shift in a lateral or longitudinal direction. Such a stick-slip event will also result in sudden spikes in strain in the wires and thus introduces a risk of detecting a false positive. Other results have shown that stick-slip events will have a significantly different profile, i.e. a significantly lower maximum SNR of the second time derivative, in the level around 25, and a fairly even distribution across all armoring elements. This should be compared to the pronounced peak around the broken wire as seen FIG. 7b. Here, the method is demonstrated with three possible outcomes of the fit to the wire break profile: a clear match that indicates a wire break, a clear mismatch that indicates no break, and an intermediate where a wire break may have occurred but is not clearly identified. In the latter case, a further test is to observe if the average strain in the wires has increased, which would indicate that strain has been redistributed from the suspected broken wire to the other wires in the tensile armoring layer.

Further details on a method for mounting optical fiber sensors to elongated armoring elements of a flexible unbonded pipe may be seen in WO 02/088659 by the applicant.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. For example, the first sensor containing layer is not limited to being a tensile armoring layer, but may, e.g., be an internal armoring layer or a pressure armoring layer.

What is claimed is:

1. A flexible pipe system comprising an unbonded flexible pipe comprising an at least partly integrated sensor system, the unbonded flexible pipe has a centre axis, a length and a longitudinal direction along the length and comprises an inner sealing sheath and at least a first armoring layer comprising a plurality of elongated armoring elements arranged around the internal sealing sheath, the sensor system comprising:
a plurality of optical fiber sensor units,
at least one light pump for optically pumping the optical fiber sensor units,
a data collecting unit, and
a computing unit, wherein
the optical fiber sensor units are optically connected to the data collecting unit, and the data collecting unit is in data communication with the computing unit, wherein the first armoring layer is a first sensor containing armoring layer in that at least one of the elongated armoring elements of the first sensor containing armoring layer is a sensor containing element, the sensor containing element or elements each having integrated therein at least a part of one or more of the optical fiber sensor units, the optical fiber sensor units of the first sensor containing armoring layer extending along a monitoring length section of the flexible pipe, and the optical fiber sensor units being arranged to measure a change in strain of the respective sensor containing elements, the sensor system being arranged to detect a change of strain in an elongated element without a sensor unit connected to the sensor system.

2. The flexible pipe system according to claim 1, wherein the sensor system and/or at least one optical fiber sensor unit is/are configured to detecting a change in strain of less than about 30 µstrain.

3. The flexible pipe system according to claim 1, wherein the first sensor containing armoring layer comprises at least one elongated armoring element without an integrated fiber optical sensor unit for measuring strain, referred to as a secondary elongate element, the sensor system being arranged to detect a change of strain in the at least one secondary elongated element.

4. The flexible pipe system according to claim 1, wherein the sensor system being capable of detecting a break in any of the elongated armoring elements of the first sensor containing armoring layer.

5. The flexible pipe system according to claim 1, wherein at least one of the sensor containing elements comprises one or more optical fiber sensor units integrated in the sensor containing element, and wherein the one or more of the optical fiber sensor units is/are rigidly fixed to the sensor containing element.

6. The flexible pipe system according to claim 1, wherein the optical fiber sensor units are arranged to extend in the respective longitudinal direction of the sensor containing elements.

7. The flexible pipe system according to claim 1, wherein at least one of the sensor containing elements is formed with a longitudinal groove to be filled with a solidifiable liquid material, and wherein the optical sensor unit is fixed in the groove by solidification of the liquid material.

8. The flexible pipe system according to claim 1, wherein the solidifiable liquid material is a polymer material.

9. The flexible pipe system according to claim 1, wherein the plurality of elongated armoring elements are helically wound around the internal sealing sheath with an angle from about 30 degrees to about 60 degrees relative to the centre axis.

10. The flexible pipe system according to claim 1, wherein the number of sensor containing elements in the first sensor containing layer is up to about 90% of the number of elongated armoring elements of the first sensor containing armoring layer.

11. The flexible pipe system according to claim 1, wherein the number of sensor containing elements in the first sensor containing layer is up to about 35.

12. The flexible pipe system according to claim 1, wherein the optical fiber sensor units in the first sensor containing layer are distributed with an angular distance between any two neighboring optical fiber sensor units in a cross section of the pipe of from about 15 degrees to about 90 degrees.

13. The flexible pipe system according to claim 1, wherein at least one of the sensor containing elements comprises at least a first optical fiber sensor unit and a second optical fiber sensor unit,
the first optical fiber sensor unit being configured to measuring strain in the sensor containing element, and the second optical fiber sensor unit being configured to measuring one or more additional parameters of the flexible pipe or surroundings of the flexible pipe.

14. The flexible pipe system according to claim 13, wherein the second optical fiber sensor is a temperature sensor configured to measuring temperature in a multitude of measurement points along a length of the flexible pipe, the multitude of measurement points having a longitudinal separation in the range from about 0.2 m to about 5 m and the temperature sensor is capable of measuring the temperature in the multitude of measurement points with a resolution of at least about 2° C.

15. The flexible pipe system according to claim 14, wherein the system is configured for detecting a flooding of an annulus or for detecting a rupture of an outer sheath.

16. The flexible pipe system according to claim 1, wherein the unbonded flexible pipe is a riser.

17. The flexible pipe system according to claim 16, wherein the riser having a top end in proximity to a sea surface, the monitoring length section of the riser measured from the top end is up to about 400 m.

18. The flexible pipe system according to claim 1, wherein at least one optical fiber sensor unit is configured to measuring strain in multiple positions in the longitudinal direction with a longitudinal resolution.

19. The flexible pipe system according to claim 18, wherein the sensor system is configured to measuring strain in the at least one optical fiber sensor unit with the longitudinal resolution being better than about 5 m.

20. The flexible pipe system according to claim 1, wherein at least one optical fiber sensor unit is configured to performing distributed measurements in the longitudinal direction.

21. The flexible pipe system according to claim 1, wherein at least one of the optical fiber sensor units comprises a number of optical fiber sensors, the number of optical fiber sensors being distributed along the monitoring length section, wherein the number of optical fiber sensors of the at least one optical fiber sensor unit is optically connected by an optical fiber link, the optical fiber link being in optical communication with the light pump and being in data communication with the data collecting unit.

22. The flexible pipe system according to claim 21, wherein the number of optical fiber sensors is approximately equidistantly distributed along the monitoring length section.

23. The flexible pipe system according to claim 21, wherein the resolution in the longitudinal direction corresponds substantially to a spacing of subsequent optical fiber sensors along the longitudinal direction.

24. The flexible pipe system according to claim 21, wherein the number of optical fiber sensors comprises fiber Bragg gratings.

25. The flexible pipe system according to claim 21, wherein the number of optical fiber sensors is in the range from about 2 to about 100.

26. The flexible pipe system according to claim 1, wherein the sensor system is configured to measuring strain with a sampling rate of at least around 10 Hz.

27. The flexible pipe system according to claim 1, wherein the optical fiber sensor units are configured to being sampled with a sampling rate of at least around 10 Hz.

28. The flexible pipe system according to claim 1, wherein the data collecting unit is configured to sampling the optical fiber sensor units with a sampling rate of at least around 10 Hz.

29. The flexible pipe system according to claim 1, wherein the data collecting unit and the computing unit are integrated to a data collecting and computing unit.

30. The flexible pipe system according to claim 1, wherein the light pump and/or a pump light signal from the pump is controlled by the data collecting unit and/or the computing unit.

31. The flexible pipe system according to claim 1, wherein the flexible pipe further comprises a second sensor containing armoring layer comprising a plurality of elongated armoring elements arranged around the internal sealing sheath, wherein at least one of the elongated armoring elements of the second sensor containing armoring layer is a sensor containing element.

32. The flexible pipe system according to claim 31, wherein the first sensor containing armoring layer and second sensor containing armoring layer are comprised as elongated armoring elements helically wound with approximately numerically equal angles in the two layers with respect to the centre axis but the angles having opposite signs.

33. The flexible pipe system according to claim 31, wherein the optical fiber sensor unit of the second sensor containing armoring layer is optically connected to a second data collecting unit and the second data collecting unit is in data communication with the computing unit and/or a second computing unit.

34. The flexible pipe system according to claim 33, wherein the second data collecting unit and the second computing unit are integrated with a second data collecting and computing unit.

35. The flexible pipe system according claim 1, wherein the flexible pipe system further comprises an end fitting being connected to an end of the unbonded flexible pipe, wherein the sensor system is capable of detecting a change in tension within the end fitting.

* * * * *

UNITED STATES PATENT AND TRADEMARK OFFICE
CERTIFICATE OF CORRECTION

PATENT NO. : 8,891,070 B2
APPLICATION NO. : 13/821044
DATED : November 18, 2014
INVENTOR(S) : Nicky Weppenaar et al.

It is certified that error appears in the above-identified patent and that said Letters Patent is hereby corrected as shown below:

In the Claims, column 15, claim 8, line 64; Please delete "1" and add -- 7 --

Signed and Sealed this
Eighth Day of March, 2016

Michelle K. Lee
*Director of the United States Patent and Trademark Office*